(12) United States Patent
Wegmann et al.

(10) Patent No.: US 10,264,502 B2
(45) Date of Patent: Apr. 16, 2019

(54) METHOD FOR ADAPTING A PARAMETER BEING INDICATIVE FOR A TRIGGER SIGNAL

(75) Inventors: Bernhard Wegmann, Holzkirchen (DE); Ingo Viering, Munich (DE); Andreas Lobinger, Grafing (DE); Dirk Rose, Munich (DE); Cinzia Sartori, Munich (DE); Juergen Michel, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 1021 days.

(21) Appl. No.: 13/823,201

(22) PCT Filed: Sep. 14, 2010

(86) PCT No.: PCT/EP2010/063428
§ 371 (c)(1),
(2), (4) Date: Apr. 23, 2013

(87) PCT Pub. No.: WO2012/034583
PCT Pub. Date: Mar. 22, 2012

(65) Prior Publication Data
US 2013/0225177 A1      Aug. 29, 2013

(51) Int. Cl.
*H04W 36/30* (2009.01)
*H04W 36/00* (2009.01)
*H04W 24/10* (2009.01)

(52) U.S. Cl.
CPC ....... *H04W 36/30* (2013.01); *H04W 36/0088* (2013.01); *H04W 24/10* (2013.01)

(58) Field of Classification Search
CPC .. H04W 36/30; H04W 36/0088; H04W 24/10
(Continued)

(56) References Cited

U.S. PATENT DOCUMENTS

| 6,044,272 A | 3/2000 | Kobylinski et al. ........... 455/437 |
| 2009/0042601 A1* | 2/2009 | Wang ................ H04W 36/0088 455/553.1 |

(Continued)

FOREIGN PATENT DOCUMENTS

| EP | 1 117 269 A1 | 7/2001 |
| GB | 2 467 351 A | 8/2010 |

(Continued)

*Primary Examiner* — Marcus Hammonds
(74) *Attorney, Agent, or Firm* — Harrington & Smith

(57) ABSTRACT

It is provided a method for adapting a parameter being indicative for a trigger signal for starting measurements, by a first base station of a first radio access network of a first type of radio access technology, of a signal quality of signals being received from a second base station of a second radio access network of a second type of radio access technology. The method includes measuring by a user equipment, which is served by the second base station, the signal quality of signals being received from the first base station, reporting a signal being indicative for the measured signal quality from the user equipment to a network entity, and adapting, by the network entity, a parameter based on the measured signal quality, wherein the parameter is indicative for a trigger signal for starting measuring a further signal quality of signals being received from the second base station.

15 Claims, 3 Drawing Sheets

(58) Field of Classification Search
USPC .......................................................... 455/437
See application file for complete search history.

(56) References Cited

U.S. PATENT DOCUMENTS

| | | | | |
|---|---|---|---|---|
| 2011/0026492 | A1* | 2/2011 | Frenger | H04W 36/34 370/331 |
| 2011/0098042 | A1* | 4/2011 | Mach | H04W 48/20 455/435.1 |
| 2011/0263256 | A1* | 10/2011 | Yavuz | H04W 36/0083 455/436 |
| 2011/0263260 | A1* | 10/2011 | Yavuz | H04W 36/0083 455/437 |

FOREIGN PATENT DOCUMENTS

| | | |
|---|---|---|
| WO | WO 2005/096657 A1 | 10/2005 |
| WO | WO 2009/021009 A1 | 2/2009 |
| WO | WO 2009/123512 A1 | 10/2009 |

* cited by examiner

"RAT A" coverage possible

METHOD FOR ADAPTING A PARAMETER BEING INDICATIVE FOR A TRIGGER SIGNAL

FIELD OF INVENTION

The present invention relates to the field of self-optimizing networks and handover between radio access networks of different radio access technologies. In particular, the present invention relates to a method for adapting a parameter being indicative for a trigger signal for starting measurements, by a first base station of a first radio access network of a first type of radio access technology, of a signal quality of signals being received from a second base station of a second radio access network of a second type of radio access technology. Further, the present invention relates to a user equipment, a network entity and a system comprising the user equipment and the network entity, which are adapted for performing the above mentioned method.

ART BACKGROUND

In mobile radio communications, a parallel operation of radio access networks (RAN) of different types of radio access technology (RAT) like LTE (Long Term Evolution), 2G (GSM/GPRS) and 3G (UMTS/HSPA) networks may be needed. Between these different RANs, inter radio access technique (inter-RAT) operations may be carried out, for instance, coverage limited handover between overlaying radio access networks. In this field, SON (self optimizing networks) and in particular MRO (mobility robustness optimization) may be used for inter-RAT mobility or load balancing between different RATs.

The target of MRO is to optimize those network configuration parameters (for example handover (HO) trigger parameters, HO thresholds or timers) that radio link failures (RLF) due to handover are reduced. In order to make the right decision in terms of parameter optimization more detailed root cause information is needed. Commonly, the optimization of network configuration parameters in 2G or 3G networks is based on labor- and cost-intensive drive testing. For the first roll-out network-wide default configuration parameters are used and if PM counters are accumulating RLFs or even call drops in a certain service areas, several optimization loops with drive testing are started to adapt parameters in a cell-specific manner.

There may be a need for providing mechanisms where cell-specific parameters are autonomously optimized to reduce high costs and the huge effort.

SUMMARY OF THE INVENTION

This need may be met by the subject matter according to the independent claims. Advantageous embodiments of the present invention are described by the dependent claims.

According to a first aspect of the invention there is provided a method for adapting a parameter being indicative for a trigger signal for starting measurements, by a first base station of a first radio access network of a first type of radio access technology, of a signal quality of signals being received from a second base station of a second radio access network of a second type of radio access technology, the method comprising measuring by a user equipment, which is served by the second base station, the signal quality of signals being received from the first base station, reporting a signal being indicative for the measured signal quality from the user equipment to a network entity, and adapting, by the network entity, a parameter based on the measured signal quality, wherein the parameter is indicative for a trigger signal for starting measuring a further signal quality of signals being received from the second base station.

This aspect of the invention is based on the idea to adapt parameters, which are indicative for or correspond to trigger thresholds, by exchanging information between different technologies.

In near future, it may be expected that LTE will be deployed as second or third radio access network (RAN) of an operator. In most areas they will exist as overlay networks. In the beginning, LTE system will only be deployed at some hotspot area embedded in wide-ranging legacy 2G/3G overlay coverage. That means that LTE networks may form islands within an area covered by 2G or 3G networks. Due to the limited LTE coverage, many Inter-RAT handovers will happen, which makes optimization of handovers between different access technologies important for the operators in order to achieve a good overall system performance.

The Inter-RAT HO is normally triggered by two events, one belonging to serving cell of RAT A and the one belonging to the neighboring or overlaying cell of RAT B. In case of LTE, there is, for instance, the Inter-RAT trigger event B2 that is defined by "Serving becomes worse than threshold_1 && inter-RAT neighbor becomes better than threshold_2".

The inter-RAT neighbor signal needs to be measured, but it is difficult to determine when to start measuring the different RAT. Therefore, there is normally another trigger which starts these measurements in order to avoid that too many inter-RAT measurements even in uncritical LTE coverage areas are carried out. Such unnecessary measurements would have several disadvantages as for instance UE battery gets drained or capacity loss due to too many transmission gaps. In case of LTE, the measurement trigger event A2 (serving becomes worse than threshold) can be used.

In case of limited coverage of one RAT (in the following RAT A, e.g. LTE here), the handover including the trigger mechanism for Inter-RAT measurements from that RAT with limited coverage to another wide-ranging RAT is quite straightforward. If the UE is leaving the LTE coverage while still being in a wide-ranging 3G (or 2G) coverage, the serving LTE signal becomes weaker and will become worse than a defined threshold by trigger A2, which triggers the Inter-RAT neighboring cell measurements (one or more cells, depending on the measurement configuration). Both quantities needed for the inter-RAT HO event can be checked. As 3G (or 2G) are covering almost the complete serving area, the second condition that 3G (or 2G) is above a certain threshold is fulfilled. The handover is triggered when also the first condition of trigger event B2 (Serving becomes worse than threshold_1) is fulfilled.

In case for measurements before handover from a wide-ranging RAT to a RAT with limited coverage (from 3G (or 2G) to LTE), this straightforward approach may not work. The trigger used from LTE to 3G/2G to start the inter-RAT neighbor measurements may not be used, since 3G (or 2G) coverage is given for the complete serving area. The serving signal of the wide-ranging RAT may be almost everywhere rather good and even if it is varying with the distance, these changes are not usable as this measure is completely uncorrelated with any hot spot areas of the other RAT (here LTE), i.e. UE is trying to measure the LTE system even though far from any LTE coverage.

This problem results from the fact that there are RATs of different coverage ranges, and independent from the RAT itself, i.e. RATs are exchangeable of being the coverage-limited one or not. For explanation, LTE is used here as coverage-limited RAT as this may be the most likely use case.

Further information, as for instance a cell-specific inter-RAT neighbor list, could be used in combination. This might be a useful approach in case of congruent cell overlay, but not in case smaller dislocated LTE hot spot areas. In that case, even if the Inter-RAT neighbor is known, it might not make sense to start measurement, since the hot spot cell only covers a small part and the UE can be far from it. Some other indication to start the measurement may be needed and this could be the serving cell signal. In this case, the corresponding threshold of this trigger signal should be determined, which depends on the location of the hot spot (centre or edge of larger overlaying 3G/2G cell. The problem is to find the optimal, cell-specific threshold to start inter-RAT measurements.

For the inter-working between 2G and 3G, the inter-RAT measurements may either be triggered for coverage reasons, i.e. if the signal of the serving RAT (i.e. UTRAN) falls below certain thresholds, or may be triggered by a call/connection setup. For the latter case, the measurements are time limited (e.g. 30 sec).

In 3G (UMTS), compressed mode may be needed to carry out inter-RAT measurements. Due to the worse orthogonality condition of the secondary scrambling codes used for the compressed mode, the number of UEs being simultaneously in compressed mode is limited (e.g. 10). If no cell is found then the measurements may be aborted without handover success. Assuming that 2G is the full coverage network with macro cells and 3G is the coverage-limited one, the handover from 3G to 2G is feasible with coverage-based trigger criterion, but vice versa the same problem may exist. The second trigger event based on call/connection setup does not help when being in connected mode.

In case of coverage reasons, a rather sub-optimal brut force approach may be to use a quite high trigger threshold leading to the fact that measurements are either carried out all the time or at least quite early. Subsequently, if too many useless measurements are carried out, UE's battery power consumption may be severely impacted and further the number of inter-RAT measurement gaps may be increasing where UE cannot be paged or scheduled.

On the other side, if the threshold is left small (close to the coverage limit in the own cell), the UE would only measure another RAT shortly before the own cell's coverage will be lost. So the own cell would not be aware of the other RAT (potentially allowing for much higher throughput), and no inter-RAT handovers would be triggered at all.

Finally, drive testing may be always a possibility to adapt parameters with the well-known and above mentioned disadvantages and, therefore, operators are looking alternatives.

Therefore, according to this aspect of the invention, it is proposed that a parameter or trigger threshold may be optimized by exchanging information between different technologies.

A method for adapting a parameter is provided. The parameter may be indicative for a trigger signal or a threshold value for starting measurements, by a first base station of a first radio access network of a first type of radio access technology, of a signal quality of signals being received from a second base station of a second radio access network of a second type of radio access technology. The first RAN may be a network with a higher coverage, like 3G or 2G, as the second RAN, for example LTE. In the following, the coverage-limited RAT is called "RAT A" or second RAT and the full-coverage network is using "RAT B" or first RAT. Furthermore, cell operated by RAT A is called "cell A" and vice versa.

The method may comprise measuring by a user equipment, which is served by the second base station, the signal quality of signals being received from the first base station. The signal quality measurement may be dedicated inter-RAT neighbor measurements (Mn of RAT B). Then, a signal being indicative for the measured signal quality may be reported from the user equipment to a network entity.

Then a parameter is adapted by the network entity based on the measured signal quality, wherein the parameter is indicative for a trigger signal for starting measuring a further signal quality of signals being received from the second base station.

Thus, dedicated inter-RAT neighbor measurements (Mn of RAT B) are carried out by RAT A and may be reported to a common central unit. A SON algorithm can use this information to adapt the serving cell signal threshold for inter-RAT measurements in cell B in a cell-specific manner.

The term "radio access network", RAN, may denote a part of a mobile telecommunication system. It may implement a radio access technology. Conceptually, it sits between the mobile phone or user equipment and the core network (CN). Examples of radio access network types are GRAN (GSM radio access network), GERAN (essentially the same as GRAN but specifying the inclusion of EDGE packet radio services) and UTRAN (UMTS radio access network). The first type of radio access technology and the second type of radio access technology may relate to different types of radio access technologies.

The term "base station" may also refer to a eNodeB or eNB.

The signal may be indicative for the measured signal quality. This may mean that the signal may comprise information about the signal quality. The term "signal quality" may denote for example a signal level or any other information relating to the properties of the signal receivable by the user equipment.

The signal comprising information about the measured signal quality and further information may be reported by the user equipment either directly to the network entity or may be saved in the user equipment. If the user equipment is handed over to the first base station, the user equipment may also report the signal to the network entity at this point of time.

In the following there will be described exemplary embodiments of the present invention.

According to an exemplary embodiment of the invention, reporting the signal may comprise transmitting a first signal being indicative for the measured signal quality from the user equipment to the second base station, and transmitting a second signal being indicative for the measured signal quality from the second base station to the network entity.

The method may comprise measuring by the user equipment, which is served by the second base station, the signal quality of signals being received from the first base station. Then, a first signal being indicative for the measured signal quality may be transmitted from the user equipment to the second base station.

Subsequently, a second signal being indicative for the measured signal quality is transmitted from the second base station to a network entity and then a parameter is adapted by the network entity based on the measured signal quality, wherein the parameter is indicative for a trigger signal for starting measuring a further signal quality of signals being received from the second base station.

The first and the second signal may be indicative for the measured signal quality. This may mean that both signals may comprise information about the signal quality.

According to an embodiment of the invention, measuring the further signal quality is carried out by the first base station and/or a further user equipment, which is served by the first base station.

The further user equipment may also be the user equipment served by the second base station before being handed over to the first base station.

According to a further embodiment of the invention, measuring the further signal quality is carried out before a user equipment, which is served by the first base station, is handed over to the second base station. This may be carried out using previously reported and exchanged measurements of a previous handover process between the same two interRAT cells in opposite direction. The measurement may start when a trigger signal based on the adapted parameter occurs. The trigger signal may be one or more events, for example a predefined signal strength or location.

According to a further embodiment of the invention, measuring the signal quality comprises measuring the signal quality at a time when a further trigger signal occurs.

According to this embodiment, the signal quality may be measured at a time, when inter-RAT neighbor measurements have been triggered, for example by the event A2. The measured signal quality may comprise a first neighbor measurement value Mn_start that has been measured when starting the inter-RAT neighbor measurements.

According to a further embodiment of the invention, measuring the signal quality comprises measuring the signal quality at a time before the user equipment, which is served by the second base station, is handed over to the first base station. The measured signal quality may comprise the neighbor measurement value Mn_HO that has been measured when handover is executed. The signal quality measurements may further optionally comprise all neighbor measurement values Mn in between.

To identify the neighbor measurements Mn, as for instance Mn_start, the values may be labeled as such or a specific message may be sent indicating the properties of this value or any other method that may provide this additional information.

According to a further embodiment of the invention, the first and/or the second signal comprise information about signal strength and/or location information of the second radio access network and the first radio access network.

In addition to the inter-RAT neighbor measurements, the reported information or first and/or the second signal can comprise signal strength, signal quality, timing advance, location information (e.g. via GPS) or any other information available to cell A (second base station) or the UE served by the second base station that refines the RAT fingerprinting. Cell A could also send additional information such as reason for the handover, own mobility parameters etc. along with the measurements.

According to a further embodiment of the invention, transmitting the second signal is carried out after the measuring has been triggered by a further trigger signal and/or during a time interval, during which the user equipment, which has been served by the second base station, is handed over to the first base station.

The information may be sent immediately when thresholds are met. Such a threshold may be for example a threshold to trigger Inter-RAT measurements or when UE is handed over from RAT A to RAT B.

According to a further embodiment of the invention, transmitting the second signal is carried out at predetermined points of time. The measurements may be collected at cell A, that means at the second base station, and then sent in dedicated time stamps. This may be for example periodically. The measurements may optionally be post-processed.

According to a further embodiment of the invention, adapting the parameter comprises statistically evaluating the signal quality.

The method, for example a SON algorithm within the network unity, may use the measured signal quality, transmitted to the network entity, either directly or indirectly after building statistics from several reports. The neighbor measurements Mn measured and reported by RAT A may be used in cell B then to determine the threshold for the serving cell measurements to initiate the inter-RAT measurements. The SON algorithm itself to determine the threshold based on the exchanged information can be proprietary.

According to a second aspect of the invention, a user equipment for adapting a parameter being indicative for a trigger signal for starting measurements, by a first base station of a first radio access network of a first type of radio access technology, of a signal quality of signals being received from a second base station of a second radio access network of a second type of radio access technology is provided, wherein the user equipment is served by the second base station, the user equipment comprising a measuring unit for measuring, the signal quality of signals being received from the first base station, and a transmitting unit for reporting a signal being indicative for the measured signal quality from the user equipment to a network entity, and wherein a parameter is adapted by the network entity based on the measured signal quality, wherein the parameter is indicative for a trigger signal for starting measuring a further signal quality of signals being received from the second base station.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiver which is adapted for receiving signals from the first base station and the second base station. The measuring unit of the user equipment may be implemented for example as part of a control unit, like a CPU or a microcontroller. Based on signals received by the receiver, the measuring unit may measure a signal quality of signals received from the first base station. The measuring unit and the receiver may be coupled or may be implemented as one single unit.

The transmitting unit may be a transmitter as known by a skilled person. The receiver and the transmitting unit may be implemented as one single unit, for example as a transceiver. The transceiver or the receiver and the transmitting unit may be adapted to communicate with the first base station and the second base station via an antenna.

According to a further aspect of the invention, a network entity for adapting a parameter being indicative for a trigger signal for starting measurements, by a first base station of a first radio access network of a first type of radio access technology, of a signal quality of signals being received from a second base station of a second radio access network of a second type of radio access technology is provided, wherein the signal quality of signals being received from the first base station is measured by a user equipment, which is served by the second base station, and which is adapted for reporting a signal being indicative for the measured signal quality from the user equipment to the network entity, the network entity comprising a receiving unit for receiving the signal being indicative for the measured signal quality, and an adapting unit for adapting a parameter based on the measured signal quality, wherein the parameter is indicative for a trigger signal for starting measuring a further signal quality of signals being received from the second base station.

The receiving unit may be a receiver as known by a skilled person. The network may also comprise a transmitter. The receiver and the transmitter may be implemented as one single unit, for example as a transceiver. The transceiver or the receiving unit and the transmitter may be adapted to communicate with other network elements via an antenna.

The receiving unit may receive from the second base station or the user equipment a signal indicative for the measured signal quality of the first base station. The adapting unit, which may be implemented for example as part of a control unit, like a CPU or a microcontroller, may receive the signal from the receiving unit and may then adapt the parameter based on the measured signal quality.

According to a further embodiment of the invention, the network entity is the first base station and/or the network entity is a common central unit.

One implementation option may be to have a centralized SON entity in the operation and maintenance (OAM) part of the network and the second signal may be reported to the centralized SON entity. This option may be used for single vendor deployment with common OAM for the different technologies.

In case of multi-vendor approach, the exchanged information as well as generation of this exchanged information may be standardized. For instance, the information could be attached to the information exchanged for the inter-RAT HO procedure (between A and B).

A third implementation option may be the usage of RAN information management (RIM) for information exchange between the two different technologies. Here, a distributed SON approach may be possible.

In a further possible implementation, the first RAN may store the information received from the second RAN together with own measurements such as signal strength, signal quality, timing advance etc. The different approaches may avoid that the terminals try to do inter-RAT neighbors measurements unnecessarily, i.e. if they are not in the vicinity of another RAT's coverage area.

The first base station may be any type of access point or point of attachment, which is capable of providing a wireless access to a telecommunication network. Thereby, the wireless access may be provided for a user equipment or for any other network element, which is capable of communicating in a wireless manner. This is also valid for the second base station.

According to a further aspect of the invention, a system for adapting a parameter being indicative for a trigger signal for starting measurements, by a first base station of a first radio access network of a first type of radio access technology, of a signal quality of signals being received from a second base station of a second radio access network of a second type of radio access technology, is provided. The system comprises the user equipment and the network entity having the above mentioned features, in particular for performing the above mentioned method.

According to a further aspect of the invention, a computer program (for instance a software routine, in source code or in executable code) is provided, which, when being executed by a processor, is adapted to control or carry out a method having the above mentioned features.

According to yet another aspect of the invention, a computer-readable medium (for instance a CD, a DVD, a USB stick, a floppy disk or a hard disk) is provided, in which a computer program is stored which, when being executed by a processor, is adapted to control or carry out a method having the above mentioned features.

Adapting a parameter, which may be performed according to aspects of the invention, can be realized by a computer program, that is by software, or by using one or more special electronic optimization circuits, that is in hardware, or in hybrid form, that is by means of software components and hardware components.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

It is noted that in different figures, similar or identical elements are provided with reference signs, which are different from the corresponding reference signs only within the first digit.

In the following, different scenarios of mobile radio communications with focus on parallel operation of LTE with 2G (GSM/GPRS) and 3G (UMTS/HSPA) networks are shown.

Figure 3:
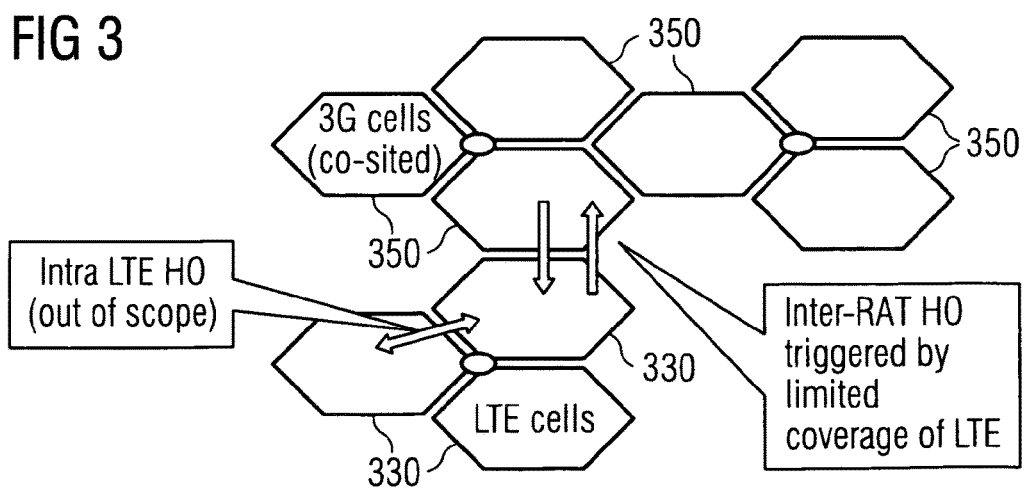
FIG. 3 shows a scenario with limited coverage of one network.

LTE may be deployed as second or third radio access network (RAN) of an operator in addition to 3G or 2G networks. In most areas, they may exist as overlay networks. LTE system 330 may for example only be deployed at some hotspot area embedded in wide-ranging legacy 2G/3G overlay coverage 350, as may be seen in FIG. 3. Due to the limited LTE coverage, many Inter-RAT handovers will happen, which makes optimization of handovers between different access technologies important for the operators in order to achieve a good overall system performance. A handover within a RAT, so called intra-RAT handover, may occur if one cell gets out of scope. An inter-RAT handover (HO) may be triggered by the limited coverage of the LTE network.

In the following, the first radio access network may refer to the network having a greater coverage and may also be called RAT B. The second radio access network may refer to the network having a limited coverage and may also be called RAT A.

The Inter-RAT HO may normally triggered by two thresholds, one belonging to serving cell of RAT A and the one belonging to the neighboring or overlaying cell of RAT B. In case of LTE, there is, for instance, the Inter-RAT trigger event B2, relating to two thresholds, that is defined as follows:

Inter-RAT trigger event B2:

Serving becomes worse than threshold_1 && inter-RAT neighbor becomes better than threshold_2

The inter-RAT neighbor signal needs to be measured, but it has to be determined when to start measuring the different RAT. Therefore, there is normally another trigger which starts these measurements in order to avoid that too many inter-RAT measurements even in uncritical LTE coverage areas are carried out. Such unnecessary measurements would have several disadvantages as for instance UE battery gets drained or capacity loss due to too many transmission gaps. In case of LTE, the measurement trigger event A2 (serving becomes worse than threshold) can be used.

In case of limited coverage of one RAT (in the following RAT A, e.g. LTE here), the handover including the trigger mechanism for Inter-RAT measurements from that RAT with limited coverage to another wide-ranging RAT may be straightforward. If the user equipment (UE) is leaving the LTE coverage while still being in a wide-ranging 3G (or 2G) coverage, the serving LTE signal becomes weaker and will become worse than a defined threshold by trigger A2, which triggers the Inter-RAT neighboring cell measurements (one or more cells, depending on the measurement configuration). Both quantities needed for the inter-RAT HO event can be checked. As 3G (or 2G) are covering almost the complete serving area, the second condition that 3G (or 2G) is above a certain threshold is fulfilled. The handover is triggered when also the first condition of trigger event B2 (Serving becomes worse than threshold_1) is fulfilled. This may be seen in FIG. 4.

Figure 4:
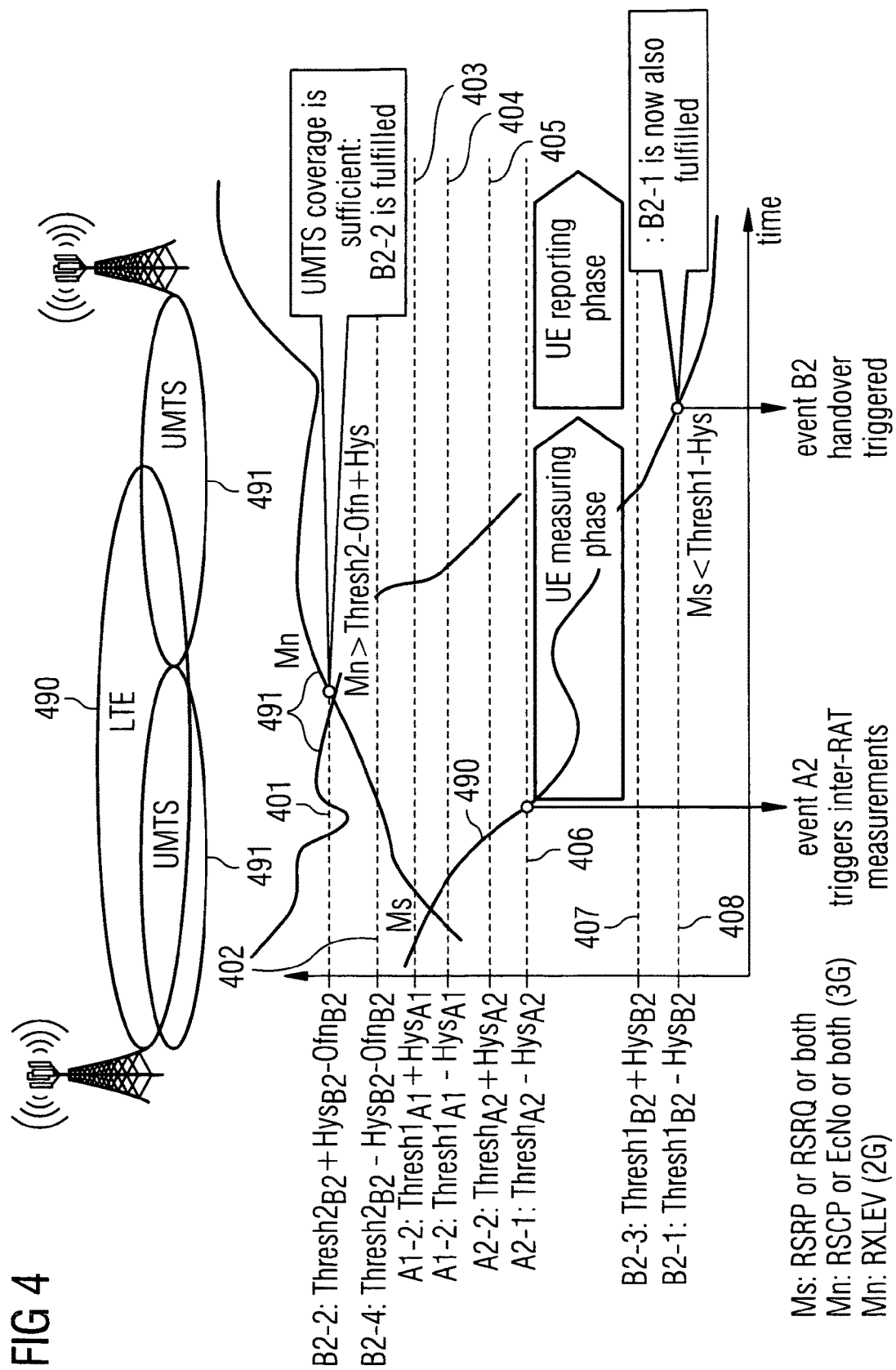
FIG. 4 shows a diagram illustrating a handover situation.

In FIG. 4, a handover from an LTE network to a 3G network with inter RAT measurements may be seen. The graphs 491 show the coverage of an 2G or 3G network, wherein the graph 490 show the coverage of an LTE network. Based on different thresholds (401, 402, 403, 404, 405, 406, 407 and 408), a handover is triggered. By the triggering event A2, inter RAT measurements are started. In the case of the event B2, the handover is triggered.

A typical implementation of the HO evaluation may be as follows. Event A2 ("Serving becomes worse than threshold") is used to trigger a measurement report from the UE. At down-crossing A2-1 (entering condition) the first report is sent. Optionally further events may be sent until an upcrossing of A2-2 (leaving condition) takes place. At reception of such report the eNB is informed and can configure the UE to perform e.g. inter-RAT measurements. Event A1 ("Serving becomes better than threshold") with the thresholds A1-1 (entering condition) and A1-2 (leaving condition) may be used to deactivate such measurements as the serving cells signal has recovered. Alternatively, if the serving cells signal level and/or quality does deteriorate further the UE detects that the serving signals measurement quantity is below B2-1 (entering condition 1) and the inter-RAT neighbor cells signal is above B2-2 (entering condition 2) the UE sends the appropriate measurement report. In other words event B2 ("serving becomes worse than threshold 1 and inter RAT neighbour becomes better than threshold 2") has been fulfilled and typically a HO to the inter RAT neighbour is attempted. B2-3 and B2-4 (leaving condition 1 and 2 resp.) are used to deactivate the event again (logical "or", i.e. leaving 1 or 2 is sufficient to leave the event).

For the other way round from a wide-ranging RAT (RAT B) to a RAT (RAT A) with limited coverage (from 3G (or 2G) to LTE), this might not work. To determine trigger to start the inter-RAT neighbor measurements may be difficult, since 3G (or 2G) coverage is given for the complete serving area. The serving signal of the wide-ranging RAT is almost everywhere rather good and even if it is varying with the distance, these changes are not usable as this measure is completely uncorrelated with any hot spot areas of the other RAT (here LTE), i.e. UE is trying to measure the LTE system even though far from any LTE coverage.

This may be a general problem that results from the fact that there are RATs of different coverage ranges, and independent from the RAT itself, i.e. RATs are exchangeable of being the coverage-limited one or not. For explanation, LTE is used here as coverage-limited RAT as this is the most likely use case.

Figure 5:
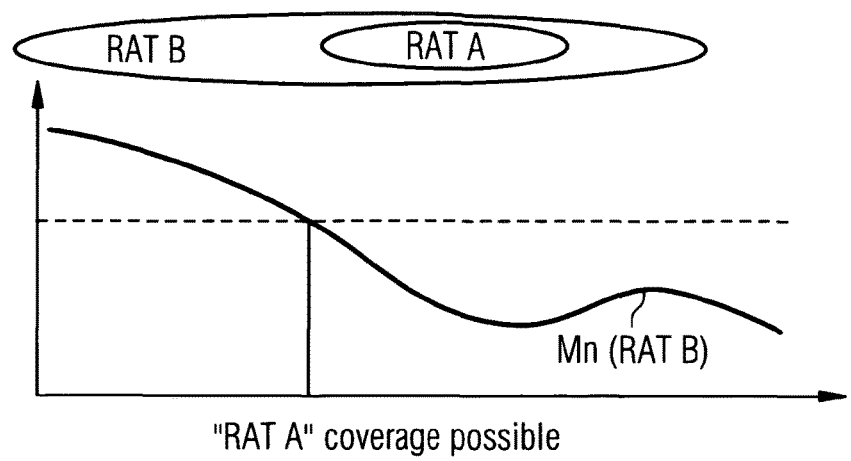
FIG. 5 shows a diagram illustrating when to start inter-RAT measurements.
Figure 6:
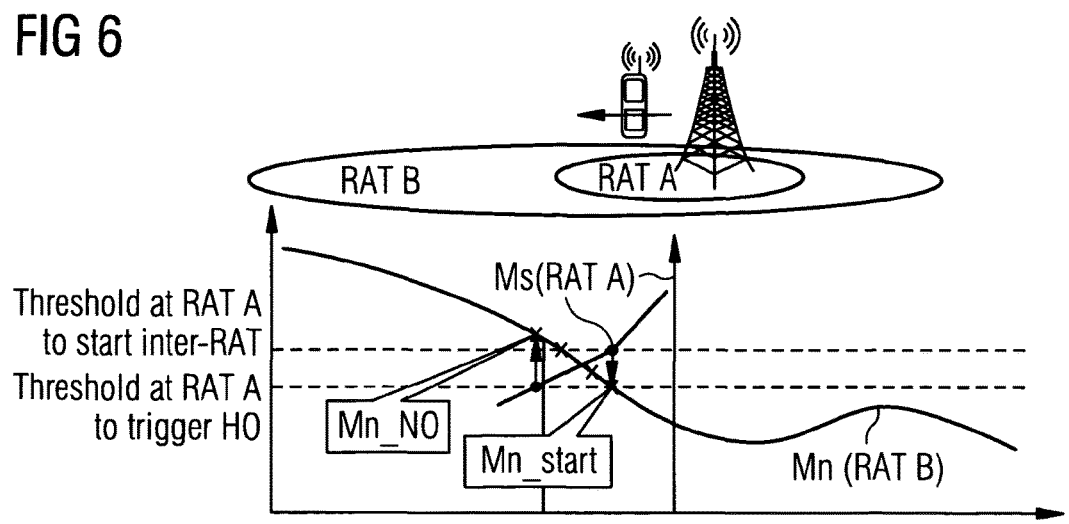
FIG. 6 shows a diagram illustrating inter-RAT measurements to be reported to a network entity.

Therefore, further information as for instance cell-specific inter-RAT neighbor list is needed which can be used in combination. This might be a useful approach in case of congruent cell overlay, but definitely not in case smaller dislocated LTE hot spot areas as shown in FIG. 5. In that case, even if the Inter-RAT neighbor is known it does not make sense to start measurement, since the hot spot cell only covers a small part and the UE can be far from it.

Figure 1:
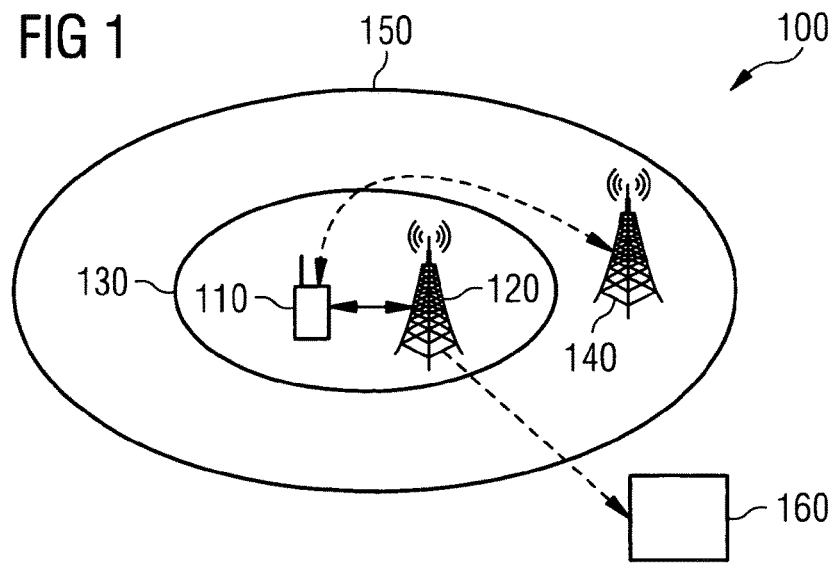
FIG. 1 shows a system according to an embodiment of the invention.

To solve these problems, according to an embodiment 100 of the invention as shown in FIG. 1, a parameter may be adapted being indicative for a trigger signal for starting measurements, by a first base station 140 of a first radio access network 150 of a first type of radio access technology, of a signal quality of signals being received from a second base station 120 of a second radio access network 130 of a second type of radio access technology. A user equipment 110, which is served by the second base station 120, measures the signal quality of signals being received from the first base station 140.

The user equipment then transmits a first signal comprising information about the measured signal quality from the user equipment to the second base station 120. The base station may transmit a second signal comprising information about the measured signal quality to a network entity 160. The network entity may be comprised within the first base station 140 or may be a common central unit. The network entity subsequently adapts the parameter based on the measured signal quality. The first base station 140 may then start inter-RAT measurements based on a trigger signal which is based on the adapted parameter.

This invention may be part of SON (self-optimized networks) and the parameters or trigger thresholds may be optimized by exchanging information between different technologies. Dedicated inter-RAT neighbor measurements (Mn of RAT B) carried out by RAT A are reported to measured neighboring cell (cell B) and/or to a common central unit for instance in OAM where both RATs are managed, and the SON algorithm can use this information to adapt the serving cell signal threshold for inter-RAT measurements in cell B in a cell-specific manner.

The information to be reported from cell A to cell B or/and to a common central unit may be comprise of the first neighbor measurement value Mn_start that has been measured when starting the inter-RAT neighbor measurements, the neighbor measurement value Mn_HO that has been measured when HO is executed and optionally all neighbor measurement values Mn in between.

In addition to these inter-RAT neighbor measurements the reported information can comprise signal strength, signal quality, timing advance, location information (e.g. via GPS) or any other information available to cell A or the aforementioned UE. Cell A could also send additional information such as reason for the handover, own mobility parameters etc. along with the measurements.

Figure 2:
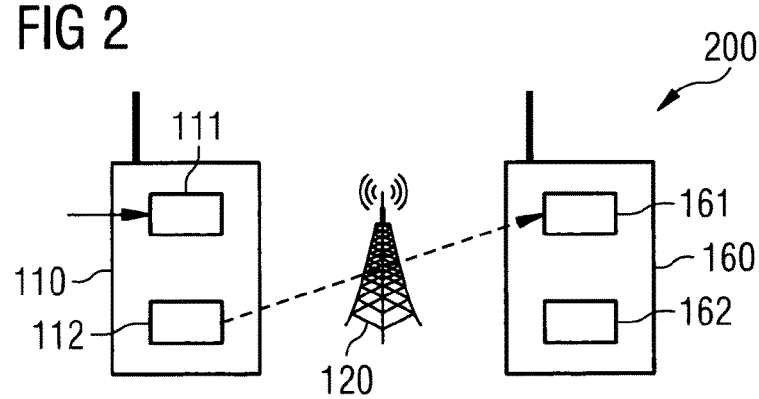
FIG. 2 shows a system according to a further embodiment of the invention.

According to a further embodiment of the invention as shown in FIG. 2, a system 200 according to a further exemplary embodiment of the invention is shown. The system comprises an user equipment 110 comprising a measuring unit 111 for measuring the signal quality of signals being received from the first base station, and a transmitting unit for transmitting a first signal being indicative for the measured signal quality from the user equipment to the second base station 120. A second signal being indicative for the measured signal quality is transmitted from the second base station to a network entity 160. The network entity 160 comprises a receiving unit 161 for receiving the second signal and an adapting unit 162 for adapting a parameter based on the measured signal quality, wherein the parameter is indicative for a trigger signal for starting measuring a further signal quality of signals being received from the second base station.

The first signal and/or the second signal can be sent either immediately when thresholds are met (e.g. to trigger Inter-RAT measurements or when the UE is handed over from the second base station to the first base station) or measurements are collected (and optionally post-processed) at the second base station and then sent at predetermined points of time.

The UE may, besides reporting the measurement information to the second base station, in addition collect and filter the measured information. In case of a handover or a connection to the first base station, the measured and filtered information may be forwarded to the first base station over an air interface of the first base station on request.

Within the network entity, which may the first base station or A central unit of a common OAM, a SON algorithm may be used, which can use the received information, i.e. the measured signal quality and further information about the first and/or the second RAN, either directly or indirectly after building statistics from several reports. The neighbor measurements Mn measured and reported by the second RAN are used in the first RAN now to determine the threshold for the serving cell measurements to initiate the inter-RAT measurements. The SON algorithm itself to determine the threshold based on the exchanged information can be proprietary.

As described above in section 2, in the coverage limited technology RAT A (here e.g. LTE) the trigger for initiating the neighbor measurements can be clearly indicated by the serving signal level. The measured inter-RAT neighbor signal measured when measurement period was started represents the signal strength of the other RAT that should be used as threshold (adjusted with some offset derived from other internal and external information,) to initiate the measurement phase for the vice-versa inter-RAT handover.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method comprising:
   determining to perform an inter-radio access technology handover of a user equipment from a second base station of a second radio access network of a second type of radio access technology to a first base station of a first radio access network of a first different type of radio access technology, comprising:
   receiving over a measurement period of time, by a network entity, reports comprising information of measurements of signal quality of signals of a first signal of the first different type of radio access technology being received by the user equipment from the first base station, and measurements of signal quality of signals of a second signal of the second different type of radio access technology being received from the second base station, wherein the user equipment is served by the second base station, wherein the network entity is embodied in at least one of the first base station and a common central unit; and
   adapting, by the network entity, a parameter based on the measured signal quality of signals of the first different type of radio access technology and the measured signal quality of signal signals of the second type of radio access technology, wherein the parameter is indicating a trigger threshold for starting measuring of a further signal quality of signals being received from the second base station, wherein the parameter is adapted based on at least a statistical analysis of the measured signal quality of the signals indicated in the reports received by the network entity over the measurement period of time, and wherein the trigger threshold is triggering the inter-radio access technology handover of the user equipment.

2. The method as set forth in claim 1, wherein measuring the further signal quality is carried out by at least one of the first base station and a further user equipment, which is served by the first base station.

3. The method as set forth in claim 1, wherein measuring the signal quality comprises measuring the signal quality at a time before the user equipment, which is served by the second base station, is handed over to the first base station.

4. The method as set forth in claim 1, wherein at least one of the first signal and the second signal comprise information about at least one of signal strength and location information of the second radio access network and the first radio access network.

5. The method as set forth in claim 1, wherein a measuring of the second signal has been triggered by at least one of a further trigger signal and during a time interval, during which the user equipment, which has been served by the second base station, is handed over to the first base station.

6. The method as set forth in claim 1, wherein the second signal is is received at a predetermined point of time.

7. The method as set forth in claim 1, wherein the first different type of radio access technology comprises one of LTE, 3G, and 2G radio technologies, and wherein the second type of radio access technology comprises a different one of LTE, 3G, and 2G radio technologies.

8. A user equipment comprising:
   at least one processor; and
   at least one memory including computer program code, where the at least one memory and the computer program code are configured, with the at least one processor, to cause the user equipment to at least:
      determine to perform an inter-radio access technology handover of the user equipment from a second base station of a second radio access network of a second type of radio access technology to a first base station of a first radio access network of a first different type of radio access technology, comprising:
      reporting signals to a network entity over a measurement period of time comprising, a first signal indicating a measured signal quality of a signal received by the user equipment from the first base station, and a second signal indicating a measured signal quality from the second base station to the network entity,
      wherein the user equipment is served by the second base station, wherein the network entity is embodied in at least one of the first base station and a common central unit,
      wherein a parameter indicating a trigger threshold for the inter-radio access technology handover is adapted by the network entity based on the measured signal quality, and
      wherein the parameter indicating the trigger threshold is adapted for starting measuring a further signal quality of signals being received by the first base station from the second base station, wherein the parameter is adapted based on at least a statistical analysis of the measured signal quality of the signals sent to the network entity over the measurement period of time, and wherein the trigger threshold is triggering the inter-radio access technology handover of the user equipment.

9. A network entity comprising:
   at least one processor; and
   at least one memory including computer program code, where the at least one memory and the computer program code are configured, with the at least one processor, to cause the network entity to at least:
   determine to perform and inter-radio access technology handover of a user equipment from a second base station of a second radio access network of a second type of radio access technology to a first base station of a first radio access network of a first different type of radio access technology, comprising:
   receiving over a measurement period of time, by the network entity, reports comprising information of measurements of signal quality of signals of a first signal of the first different type of radio access technology being received by the user equipment from the first base station, and measurements of signal quality of signals of a second signal of the second different type of radio access technology being received from the second base station, wherein the user equipment is served by the second base station, wherein the network entity is embodied in at least one of the first base station and a common central unit; and
   adapting a parameter based on the measured signal quality of the first different type of radio access technology and the measured signal quality of signal signals of the second type of radio access technology,
   wherein the parameter indicating the trigger threshold is indicating a trigger threshold for starting measuring a further signal quality of signals being received from the second base station,
   wherein the parameter is adapted based on at least a statistical analysis of the measured signal quality of the signals indicated in the reports received by the network entity over the measurement period of time, and
   wherein the trigger threshold is triggering the inter-radio access technology handover of the user equipment.

10. The network entity as set forth in claim 9, wherein measuring the further signal quality is carried out by at least one of the first base station and a further user equipment, which is served by the first base station.

11. The network entity as set forth in claim 9, wherein measuring the further signal quality is carried out before the user equipment, which is served by the second base station, is handed over to the first base station.

12. The network entity as set forth in claim 9, wherein
   at least one of the first signal and the second signal comprise information about at least one of signal strength and location information of the second radio access network and the first radio access network.

13. The network entity as set forth in claim 9, wherein
   a measuring of the second signal is triggered by at least one of a further trigger signal and during a time interval, during which the user equipment, which has been served by the second base station, is handed over to the first base station.

14. The network entity as set forth in claim 9, wherein
   the second signal is received at a predetermined point of time.

15. The network entity as set forth in claim 9, wherein the first different type of radio access technology comprises one of LTE, 3G, and 2G radio technologies, and wherein the second type of radio access technology comprises a different one of LTE, 3G, and 2G radio technologies.

* * * * *